Jan. 21, 1947. J. W. SHEPERDSON 2,414,772
SHEARING APPARATUS
Filed Oct. 11, 1944 3 Sheets-Sheet 1
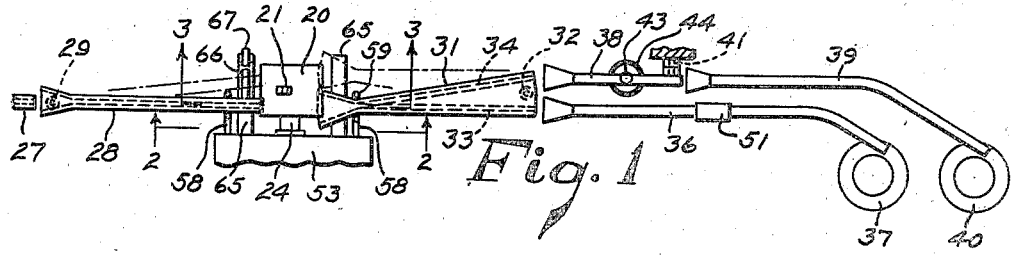
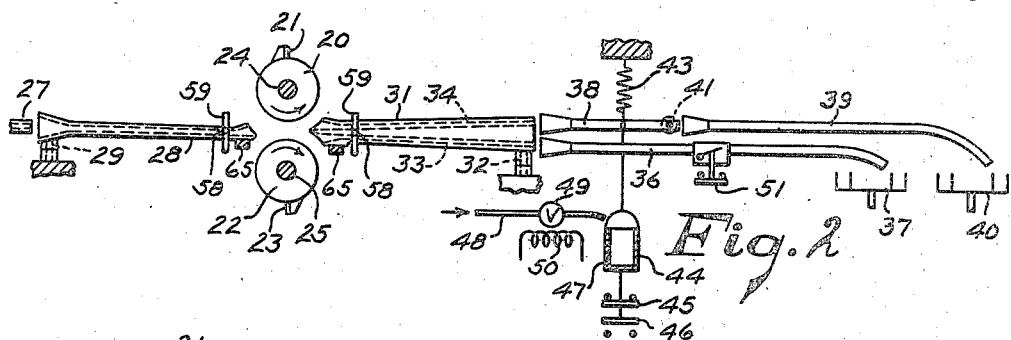
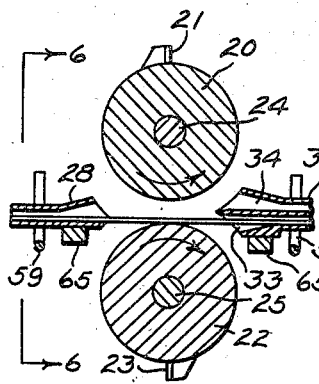
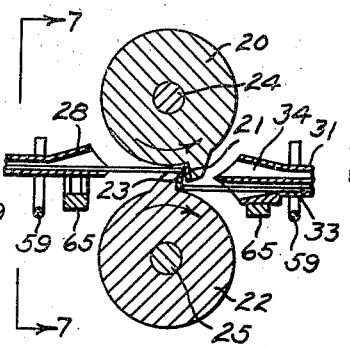
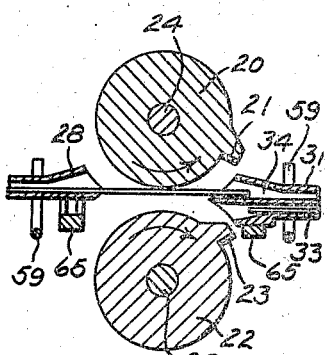
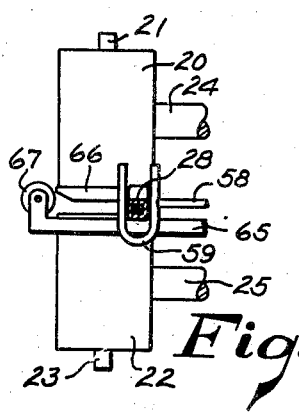
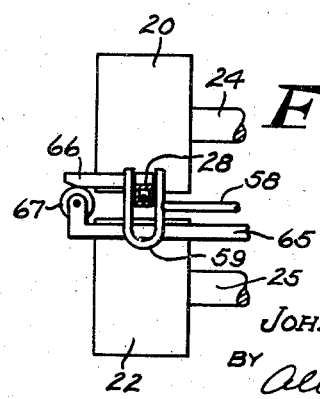
INVENTOR
JOHN W. SHEPERDSON
BY Albert G. Blodgett
ATTORNEY

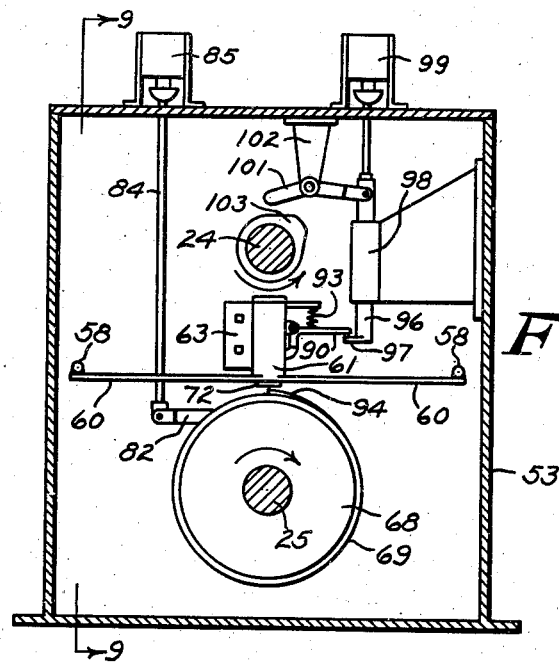
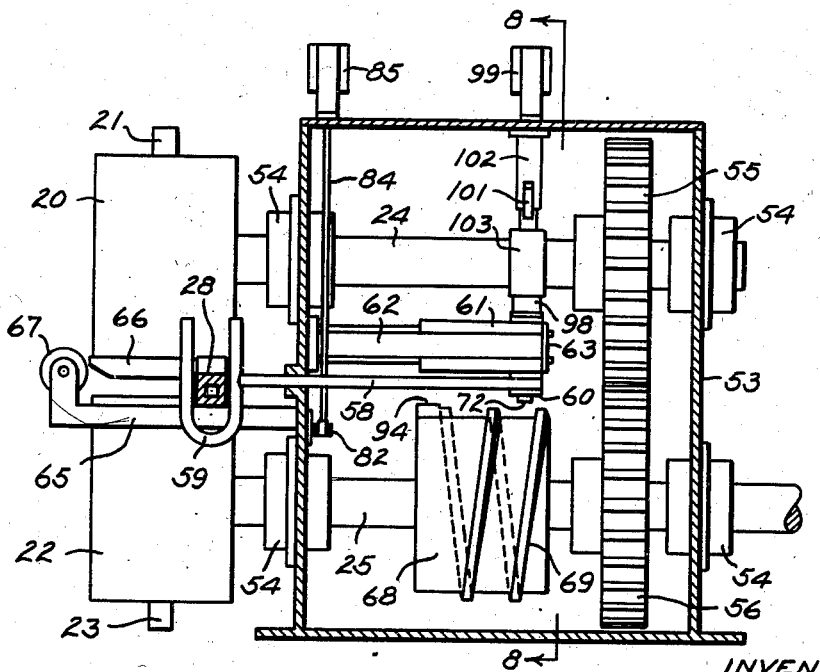

Jan. 21, 1947.  J. W. SHEPERDSON  2,414,772
SHEARING APPARATUS
Filed Oct. 11, 1944  3 Sheets—Sheet 3

INVENTOR
JOHN W. SHEPERDSON
BY
Albert G. Blodgett
ATTORNEY

Patented Jan. 21, 1947

2,414,772

UNITED STATES PATENT OFFICE 2,414,772

SHEARING APPARATUS

John W. Sheperdson, Worcester, Mass., assignor to Morgan Construction Company, Worcester, Mass., a corporation of Massachusetts Application October 11, 1944, Serial No. 558,222

13 Claims. (Cl. 164—66)

This invention relates to shearing apparatus, and more particularly to apparatus for severing metal bars as they travel longitudinally at high speed.

In the manufacture of metal rod for use in wire-drawing, it is the usual practice to supply heated billets to a continuous rod rolling mill which discharges its rolled product to suitable reels arranged to coil the rod into annular bundles. Thus all the material in one billet (except for losses from cropping of the ends and oxidation) goes into a single bundle, and the bundles weigh substantially the same as the billets. In some circumstances it would be advantageous to form two or more rod bundles from a single billet, and this could be accomplished by severing the finished rod and coiling the pieces separately. However, the delivery speed of modern rod mills is in excess of seventy feet per second, and the cutting and switching of metal bars at such speeds is a very difficult matter.

It is accordingly one object of the invention to provide a shearing apparatus capable of severing bars as they travel longitudinally at very high speeds.

It is a further object of the invention to provide a shearing apparatus capable of severing metal rods as they are discharged from a rod rolling mill.

It is a further object of the invention to provide a shearing apparatus capable of severing a rapidly traveling metal bar and directing the front end of the second portion of the bar into a different path of travel.

It is a further object of the invention to provide a new and advantageous arrangement of apparatus capable of severing metal rods as they are discharged from a rolling mill and coiling the severed portions into separate annular bundles.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a plan view of apparatus for shearing and coiling wire rod;

Fig. 2 is a side elevation of the apparatus, shown in partial section on the line 2—2 of Fig. 1;

Fig. 3 is an enlarged view in section on the line 3—3 of Fig. 1;

Fig. 4 is a view similar to Fig. 3, showing the rod severed by the action of the shear blades;

Fig. 5 is a view similar to Fig. 4, showing the position of the parts a moment later;

Fig. 6 is a section on the line 6—6 of Fig. 3;

Fig. 7 is a section on the line 7—7 of Fig. 4;

Fig. 8 is an enlarged view of the shear driving mechanism, shown in section on line 8—8 of Fig. 9;

Fig. 9 is a section on the line 9—9 of Fig. 8;

Figure 10:
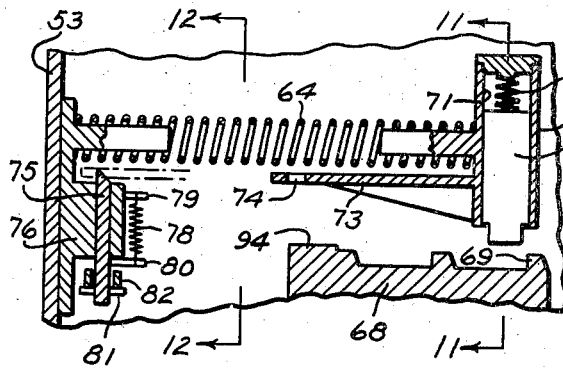
Fig. 10 is a fragmentary view of the shear driving mechanism, shown in section on the line 10—10 of Fig. 11.

Referring first to Figs. 1 and 2, the embodiment illustrated comprises an upper drum 20 having a shear blade 21 thereon and a lower drum 22 having a shear blade 23 thereon, these drums being mounted on parallel horizontal rotatable shafts 24 and 25 respectively. The blades revolve continuously at a peripheral speed substantially equal to the longitudinal speed of the rod which is to be severed, and they meet in an overlapping relationship once in each revolution, with the upper blade 21 in advance of the lower blade 23, as shown in Fig. 4.

As the rod issues from the rolling mill it travels through a pipe 27 leading to a switch pipe 28 which is supported adjacent its entrance end by a vertical pivot 29. Upon emerging from the switch pipe 28 the rod passes between the drums 20—22 and enters a switch pipe 31 which is supported adjacent its outlet end by a vertical pivot 32. This pipe 31 is provided with two separate longitudinal passages 33 and 34, the entrance end of the passage 33 being directly beneath the entrance end of the passage 34. These entrance ends are bell-mouthed to minimize the possibility of cobbles. The lower passage 33 leads to a pipe 36 through which the rod may travel to a pouring reel 37, and the upper passage 34 leads to a switch pipe 38 and thence to a pipe 39 through which the rod may travel to a pouring reel 40. The switch pipe 38 is supported adjacent its outlet end by a horizontal pivot 41, and biased toward its upper position by a tension spring 43. A bucket 44 is suspended from the switch pipe 38 and connected to a normally closed electric switch 45 and to a normally open electric switch 46. The bucket is provided with a discharge orifice 47, and water is supplied to the bucket by a pipe 48 having a normally closed valve 49 controlled by a solenoid 50. A normally closed flag switch 51 is associated with the pipe 36 and arranged to be held open by each rod as it travels through the pipe. The switches 45, 46 and 51 are used to obtain automatic control of the shearing operation, as will be explained hereinafter.

Referring now to Figs. 8 and 9, a suitable frame or casing 53 is located at one side of the drums 20—22, this casing providing a support for two pairs of bearings 54 which carry the rotatable shafts 24—25. These shafts are connected by a pair of gears 55—56 within the casing. The lower shaft 25 extends beyond the casing so that it may be connected to a suitable driving means, such as an electric motor (not shown).

In order to control the positions of the two switch pipes 28 and 31, and thereby control the path of the rod in relation to the shear blades, two horizontal bars 58 are slidably mounted in the casing 53 with one end of each bar extending outwardly therefrom. These outer ends of the bars are provided with U-shaped loops 59 which straddle the corresponding switch pipes. The inner ends of the bars are connected to arms 60 which project laterally from opposite sides of a central member 61, this member being slidably supported on a horizontal bar 62 of dove-tail cross section located beneath the upper shaft 24. A stop plate 63 (Fig. 9) is attached to the end of the bar 62 to limit the inward movement of the member 61 and the bars 58. The member 61 is yieldably urged toward the stop plate 63 by a coiled compression spring 64 (Fig. 10). It will be apparent that by sliding the member 61 outwardly along the bar 62 toward the shear drums, the switch pipes 28—31 can be moved from the full line positions shown in Fig. 1 to the broken line positions, thereby moving the rod laterally through the path of travel of the switch blades 21—23 and severing the rod. During this movement the ends of the switch pipes are supported by two arms 65 which extend horizontally from the casing 53 and beneath the switch pipes. The outlet end of the switch pipe 28 is preferably lifted slightly during its outward travel to correspond with the lifting of the rod brought about by the action of the lower blade 23 at the time of the cut. For this purpose the switch pipe 28 is provided with a laterally projecting finger 66 arranged to engage an idler roller 67 mounted on the outer end of the corresponding arm 65, as shown in Fig. 7. The pivot 29 is fitted with sufficient looseness to permit such movement of the pipe 28.

Since the rod issues from the rolling mill at high longitudinal speed, the speed of rotation of the shear drums 20—22 must also be high in order that the peripheral speed of the blades may correspond rather closely to the rod speed. For example, if the speed of the rod is 70 feet per second, and the shear blades revolve in a circle say 18 inches in diameter, the drums should rotate at approximately 15 revolutions per second. The rod must be moved laterally into the path of the blades while they are separated, and after the rod has been severed it must be moved out of the path of the blades very promptly in order to prevent a second cutting of the rod. The movements of the rod must therefore be very accurately related to the movements of the blades.

In order to obtain the required control over the lateral position of the rod, a drum 68 is mounted on the lower shaft 25 beneath the slidable member 61, and the peripheral surface of this drum is provided with a helical rib or screw thread 69. The member 61 is provided with a vertical bore 71 (Figs. 10 and 11) to receive a vertically slidable dog or plunger 72. When this plunger is moved downwardly, its lower portion will be engaged by the thread 69 on the rotating drum 68. Consequently the member 61 will be moved outwardly along its guide 62, compressing the spring 64, and swinging the switch pipes 28—31 to their broken line positions in Fig. 1. The pitch of the thread 69 is so related to the width of the shear blades 21—23 and to their positions on the drums 20—22 that the rod will be properly severed during this movement.

Figure 12:
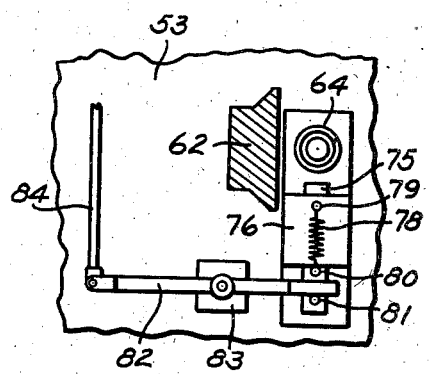
Fig. 12 is a section on the line 12—12 of Fig. 10.

The slidable member 61 is held in its outward position, following severance of the rod, until the tail end of the rod has passed the shear drums. For this purpose the member 61 is provided with a horizontal finger 73 (Fig. 10) which extends outwardly beneath the spring 64. In the outer end of this finger there is formed an opening 74 arranged to receive the upper end of a latch 75 when the member 61 is at the outer end of its stroke. The latch 75 is slidable vertically in a bracket 76 mounted on the wall of the casing 53. A coiled tension spring 78 connects a pin 79 on the bracket 76 with a pin 80 on the latch to hold the latch yieldably in its upper position. In order to release the latch, a pin 81 is mounted in its lower end to engage one end of a horizontal lever 82 (Fig. 12) fulcrumed on a bracket 83 on the wall of the casing. The other end of this lever 82 is connected by a vertical rod 84 to the plunger of a solenoid 85 (Fig. 8) mounted on the top of the casing. Upon energization of this solenoid, the lever 82 will be rocked to release the latch 75.

Figure 11:
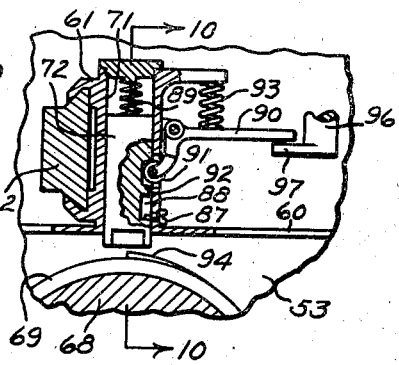
Fig. 11 is a section on the line 11—11 of Fig. 10.

Referring now to Fig. 11, it will be seen that a stop screw 87 is mounted in the member 61 and extends into a short vertical slot 88 in the side of the plunger 72 to prevent rotation of the plunger and to limit its vertical travel. The plunger is urged downwardly by a coiled compression spring 89, and it is normally held in its raised or retracted position by a latch 90 in the form of a bell crank pivotally mounted on the member 61. This latch carries an idler roller 91 arranged to enter a recess 92 in the side of the plunger 72. A coiled compression spring 93 urges the latch 90 into engagement with the plunger, this spring being of sufficient strength to force the roller 91 into the recess 92 and hold the plunger in its retracted position despite the downward pressure of the spring 69. In order to raise the plunger to its retracted position when the member 61 has moved outwardly along the guide 62 and the finger 73 has been engaged by the latch 75, a cam 94 is provided on the drum 68, adjacent the outer end of the helical rib 69. This cam will engage the lower end of the plunger and lift it far enough to allow the roller 91 to enter part way into the recess 92, whereupon the spring 93 will force the roller all the way into the recess and thereby lift the plunger slightly beyond the path of the cam, so that the revolving cam will no longer strike the plunger. When the plunger is retracted, it is slightly above the top of the rib 69 and hence will not interfere with the return travel of the member 61 under the influence of the spring 64.

Means is provided to release the latch 90 when it is desired to sever the stock. For this purpose a vertical rod 96 is mounted adjacent the latch and provided with a toe or hook 97 which extends laterally beneath the outer end of the latch. This rod is slidably supported in a guide 98 (Fig. 8) carried by the casing 53, and the upper end of the rod is connected to the plunger of a solenoid 99 mounted on the top of the casing. Upon energization of this solenoid, the rod 96 will be lifted, and the latch 90 will be released, whereupon the spring 89 will force the plunger 72 downwardly for engagement with the helical rib 69. It is desirable that the plunger should be fully lowered before it is engaged laterally by the rib, in order to obtain ample area of contact between these parts. Accordingly the released plunger should either drop immediately between successive convolutions of the rib or first engage the top surface of the rib and drop therefrom as the rib revolves. In order to prevent release of the plunger at such times in the cycle as might cause excessive wear on the lower portion thereof, a lever 101 (Fig. 8) is fulcrumed on a bracket 102 depending from the top of the casing 53. One end of this lever is connected to the rod 96 which serves to release the latch 90, and the other end of the lever is located adjacent a cam 103 on the upper shaft 24. This cam is shaped to prevent tilting of the lever 101 and release of the latch 90 except at the proper time in relation to the rotation of the drum 68.

Figure 13:
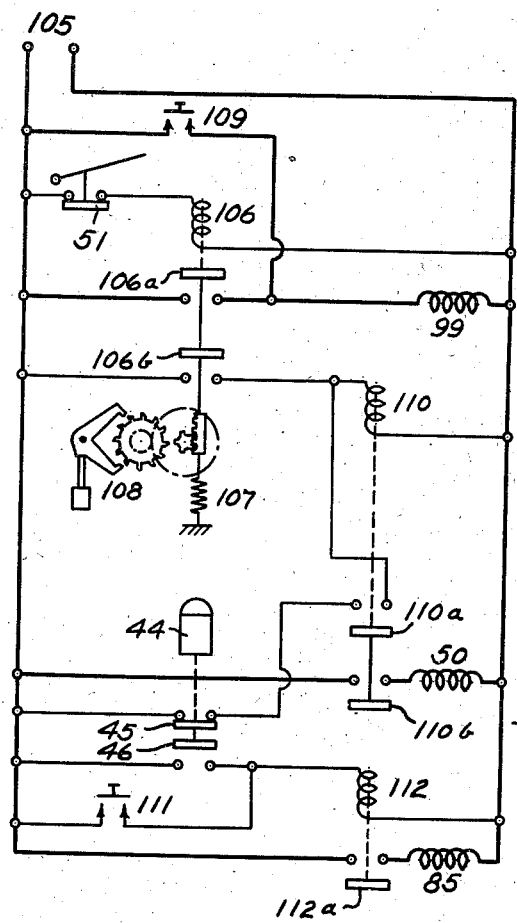
Fig. 13 is a diagram of certain electrical circuits utilized in the automatic control of the shearing apparatus.

Referring now to Fig. 13, it will be seen that the several solenoids and switches already described are associated with certain other electrical apparatus arranged to obtain automatic control of the operation. In this diagram the numeral 105 indicates a suitable source of electrical energy. The limit switch 51 is connected in series with the coil 10 of a time delay relay having two switches 106a and 106b biased toward closed position by a tension spring 107, the relay also including an escapement mechanism 108 to control the movement of the switches under the influence of the spring 107. The switch 106a is shunted by a normally open push button 109, and these parts are connected in series with the solenoid 99 which initiates the cutting operation. The switch 106b is connected in series with the coil 110 of a magnetic contactor having two normally open switches 110a and 110b. The bucket-actuated switch 45 is connected in series with the switch 110a and the coil 110. The bucket-actuated switch 46 is shunted by a normally open push button 111, and these parts are connected in series with the coil 112 of a magnetic contactor having a normally open switch 112a, this in turn being connected in series with the solenoid 85 which initiates the return movement of the sliding member 61. The switch 110b is connected in series with the solenoid 50 which controls the valve 49 of Fig. 2.

The operation of the invention will now be apparent from the above disclosure. When each rod issuing from the rolling mill approaches the apparatus through the pipe 27, the switch pipes 28 and 31 will be in the positions shown in full lines in Fig. 1. Consequently the rod will travel through the switch pipe 28, between the shear drums 20—22 at the inner side of the blocks 21—23, thence through the passage 33 of the switch pipe 31, and through the pipe 36 to the reel 37, where it will be coiled in a bundle. When the front end of the rod reaches the flag switch 51, this switch will open, deenergizing the coil 106 of the time delay relay, and the spring 107 will start to close the switches 106a and 106b at a rate controlled by the adjustment of the escapement mechanism 108. After a time interval such that approximately one-half the length of the rod has passed the shear drums, the switches 106a and 106b will close, energizing solenoid 99 and coil 110. Solenoid 99 will raise the rod 96 and release the latch 90, whereupon the spring 89 will project the plunger 72 downwardly to engage the helical rib 69 on the rotating drum 68. This rib will force the plunger 72 and the member 61 outwardly along the guide 62, compressing the spring 64, until the latch 75 has entered the opening 74 in the finger 73 to hold the member 61 in its outer position. At this time the cam 94 will raise the plunger 72, and the spring 93 will reset the latch 90, forcing the roller 91 into the recess 92, the latch now being positioned away from the rod 96 and hence out of the control of the solenoid 99. As the member 61 travels outwardly, the bars 58 will slide outwardly, swinging the switch pipes 28—31 outwardly, and moving the rod transversely across the path of the revolving blades 21—23, which will sever the rod. Just prior to the instant of the cut, the finger 66 will engage the roller 67 and raise the outlet end of the switch pipe 28 slightly, as shown in Fig. 7. As the cut is completed, the lower shear blade 23 will hold the new front end of the rod upwardly in the manner indicated in Fig. 4, and a moment later this new front end will enter the passage 34 as shown in Fig. 5. Thus the second half of the rod will travel through the passage 34, the switch pipe 38, and the pipe 39 to the reel 40, where it will be coiled into a bundle.

As the coil 110 became energized through closure of the switch 106b, the switches 110a and 110b closed, the latter serving to energize the solenoid 50, opening the valve 49, and allowing water to flow from the pipe 48 into the bucket. As the second half of the rod continues to travel through the passage 34, it will prevent the switch pipe 38 from swinging downwardly under the weight of the filled bucket. In the meantime, the first half of the rod will leave the flag switch 51, which will thereupon close, energizing the coil 106 and opening switches 106a and 106b. Coil 110 will remain energized through switches 45 and 110a. As the tail end of the second half of the rod leaves the passage 34, the weight of the filled bucket 44 will swing the pipe 38 downwardly, opening switch 45 and closing switch 46. Opening switch 45 will deenergize coil 110, opening switch 110b, deenergizing solenoid 50, and closing valve 49. Closing switch 46 will energize coil 112, closing switch 112a, and energizing solenoid 85, which will retract the latch 75 and allow the spring 64 to slide the member 61 inwardly to its original position. The water will escape from the bucket 44 through the orifice 47, and the spring 43 will return the switch pipe 38 to its original position. Upon arrival of the next rod the cycle will be repeated. The push buttons 109 and 111 make it possible to operate the apparatus by manual control of the energization of the latch-release solenoids 85 and 99.

It will be apparent that the screw thread 69 ensures a very accurate control over the lateral movement of the rod with relation to the revolving blades 21—23. The arrangement is such that the rod will be shifted into the path of the blades without interference therewith and then out of the path of the blades at the completion of the cut, before the blades can meet again. The laterally movable guide pipes 28 and 31 can be of relatively light construction, with correspondingly low inertia, so that it is feasible to move them with the required speed. The apparatus is accordingly well adapted for operating upon finished rods as they issue from the last stand of the rolling mill. By making a single cut on each rod, it is possible to obtain two bundles from a single billet. Thus, billets weighing 600 pounds may be fed to the rod mill, and for each such billet two 300 pound bundles of finished rod may be obtained. The apparatus is comparatively simple and thoroughly dependable in service.

Having thus described my invention, what I claim as new and desire to secure by Letters Patent is:

1. Apparatus for severing longitudinally traveling bars comprising two cooperating rotary shear blades, a guide to direct each approaching bar into a path at one side of the blades, a guide to receive the bar as it passes the blades, and means to shift both guides simultaneously in a lateral direction and thereby move the bar laterally to a path at the other side of the blades, the blades severing the bar during its lateral movement.

2. Apparatus for severing longitudinally traveling bars comprising two cooperating rotary shear blades which overlap at the time of the cut, a guide to direct each approaching bar into a path at one side of the blades, a second guide having two passages therein one of which serves to receive the bar as it passes the blades, and means to shift both guides simultaneously in a lateral direction and thereby move the bar laterally to a path at the other side of the blades, the blades severing the bar during its lateral movement and simultaneously by reason of their overlapping relationship directing the new front end of the bar into the other of said passages.

3. Apparatus for severing longitudinally traveling bars comprising two cooperating shear blades revolving about parallel axes and arranged to overlap at the time of the cut, a guide to direct each approaching bar into a path at one side of the blades, a second guide having two passages therein with their entrance ends closely adjacent and displaced in a direction transverse to the said axes, one of said passages serving to receive the bar as it passes the blades, and means to shift both guides simultaneously in a lateral direction and thereby move the bar laterally to a path on the other side of the blades, the blades severing the bar during its lateral movement and one of the blades simultaneously shifting the new front end of the bar in a direction transverse to the axes of the blades to direct the said new front end into the other of said passages.

4. Apparatus for severing longitudinally traveling bars comprising upper and lower cooperating shear blades revolving about parallel horizontal axes and arranged to overlap at the time of the cut, a guide to direct each approaching bar into a path at one side of the blades, a second guide having two passages therein with their entrance ends closely adjacent and one above the other, one of said passages serving to receive the bar as it passes the blades, and means to shift both guides simultaneously in a lateral direction and thereby move the bar laterally to a path at the other side of the blades, the blades severing the bar during its lateral movement and simultaneously by reason of their overlapping relationship directing the new front end of the bar into the other of said passages.

5. Apparatus for severing longitudinally traveling bars comprising upper and lower cooperating shear blades revolving about parallel horizontal axes with the lower blade overlapping the rear surface of the upper blade at the time of the cut, a guide to direct each approaching bar into a path at one side of the blades, a second guide having two passages therein with their entrance ends closely adjacent and one above the other, the lower passage serving to receive the bar as it passes the blades, and means to shift both guides simultaneously in a lateral direction and thereby move the bar laterally to a path at the other side of the blades, the blades severing the bar during its lateral movement and the lower blade simultaneously lifting the new front end of the bar to direct the same into the upper passage.

6. Apparatus for severing longitudinally traveling bars comprising two cooperating shear blades revolving about parallel axes and arranged to overlap at the time of the cut, a guide to direct each approaching bar into a path at one side of the blades, a second guide having two passages therein with their entrance ends closely adjacent and displaced in a direction transverse to the said axes, one of said passages serving to receive the bar as it passes the blades, means to shift both guides simultaneously in a lateral direction and thereby move the bar laterally to a path on the other side of the blades, the blades severing the bar during its lateral movement and one of the blades simultaneously shifting the new front end of the bar in a direction transverse to the axes of the blades to direct the said new front end into the other of said passages, and means to shift the first guide at the time of the cut in a direction corresponding to the direction of shifting of the said new front end of the bar.

7. Apparatus for severing longitudinally traveling bars comprising upper and lower cooperating shear blades revolving about parallel horizontal axes with the lower blade overlapping the rear surface of the upper blade at the time of the cut, a guide to direct each approaching bar into a path at one side of the blades, a second guide having two passages therein with their entrance ends closely adjacent and one above the other, the lower passage serving to receive the bar as it passes the blades, means to shift both guides simultaneously in a lateral direction and thereby move the bar laterally to a path at the other side of the blades, the blades severing the bar during its lateral movement and the lower blade simultaneously lifting the new front end of the bar to direct the same into the upper passage, and means to raise the first guide at the time of the cut to correspond with the lifting of the bar by the lower blade.

8. Apparatus for severing longitudinally traveling bars comprising two cooperating shear blades revolving about parallel axes, a guide to direct each approaching bar into a path at one side of the blades, a rotatable drum having a helical rib thereon, means to drive the drum and shear blades in timed relationship, a slidable member connected to the guide to move the same laterally, and a dog carried by the member, the dog being movable into engagement with the said rib to slide the member and shift the guide laterally, thereby moving the bar laterally to a path on the other side of the blades, the blades severing the bar during its lateral movement.

9. Apparatus for severing longitudinally traveling bars comprising two cooperating shear blades revolving about parallel axes, a guide to direct each approaching bar into a path at one side of the blades, a rotatable drum having a helical rib thereon, means to drive the drum and shear blades in timed relationship, a slidable member connected to the guide to move the same laterally, a dog carried by the member, a releasable latch to retain the dog in a retracted position, and means effective upon release of the latch to project the dog into engagement with the said rib to slide the member and shift the guide laterally, thereby moving the bar laterally to a path on the other side of the blades, the blades severing the bar during its lateral movement.

10. Apparatus for severing longitudinally traveling bars comprising two cooperating shear blades revolving about parallel axes, a guide to direct each bar as it approaches the blades, a rotatable drum having a helical rib thereon, means to drive the drum and shear blades in timed relationship, a slidable member connected to the guide to move the same laterally, the member being slidable between an inner position such that the guide will direct the bar into a path at one side of the blades and an outer position such that the guide will direct the bar into a path at the other side of the blades, a dog carried by the member, a releasable latch to retain the dog in a retracted position, means effective upon release of the latch to project the dog into engagement with said rib to slide the member to its outer position, the blades severing the bar during the outward movement of the member, and means to retract the dog and reset the latch as the member reaches its outer position.

11. Apparatus for severing longitudinally traveling bars comprising two cooperating shear blades revolving about parallel axes, a guide to direct each bar as it approaches the blades, a rotatable drum having a helical rib thereon, means to drive the drum and shear blades in timed relationship, a slidable member connected to the guide to move the same laterally, the member being slidable between an inner position such that the guide will direct the bar into a path at one side of the blades and an outer position such that the guide will direct the bar into a path at the other side of the blades, a dog carried by the member, a releasable latch to retain the dog in a retracted position, means effective upon release of the latch to project the dog into engagement with said rib to slide the member to its outer position, the blades severing the bar during the outward movement of the member, a releasable latch to hold the member in its outer position, and means to return the member to its inner position upon release of the last-mentioned latch.

12. Apparatus for severing longitudinally traveling bars comprising two cooperating shear blades revolving about parallel axes, a guide to direct each bar as it approaches the blades, a rotatable drum having a helical rib thereon, means to drive the drum and shear blades in timed relationship, a slidable member connected to the guide to move the same laterally, the member being slidable between an inner position such that the guide will direct the bar into a path at one side of the blades and an outer position such that the guide will direct the bar into a path at the other side of the blades, a dog carried by the member, a releasable latch to retain the dog in a retracted position, means effective upon release of the latch to project the dog into engagement with said rib to slide the member to its outer position, the blades severing the bar during the outward movement of the member, and a cam on the drum at the outer end of the rib arranged to retract the dog and reset the latch as the member reaches its outer position.

13. Apparatus for severing longitudinally traveling bars comprising two cooperating rotary shear blades, a guide to direct each approaching bar into a path at one side of the blades, means to shift the guide laterally and move the bar laterally to a path at the other side of the blades, the blades severing the bar during its lateral movement, and automatically operable means to return the guide to its original position when the tail end of the bar has passed beyond the blades.

JOHN W. SHEPERDSON.